Aug. 18, 1953　　　　A. STIEGLER　　　　2,648,872
CONTINUOUS VULCANIZING APPARATUS
Filed Nov. 8, 1949　　　　　　　　　　　2 Sheets-Sheet 1
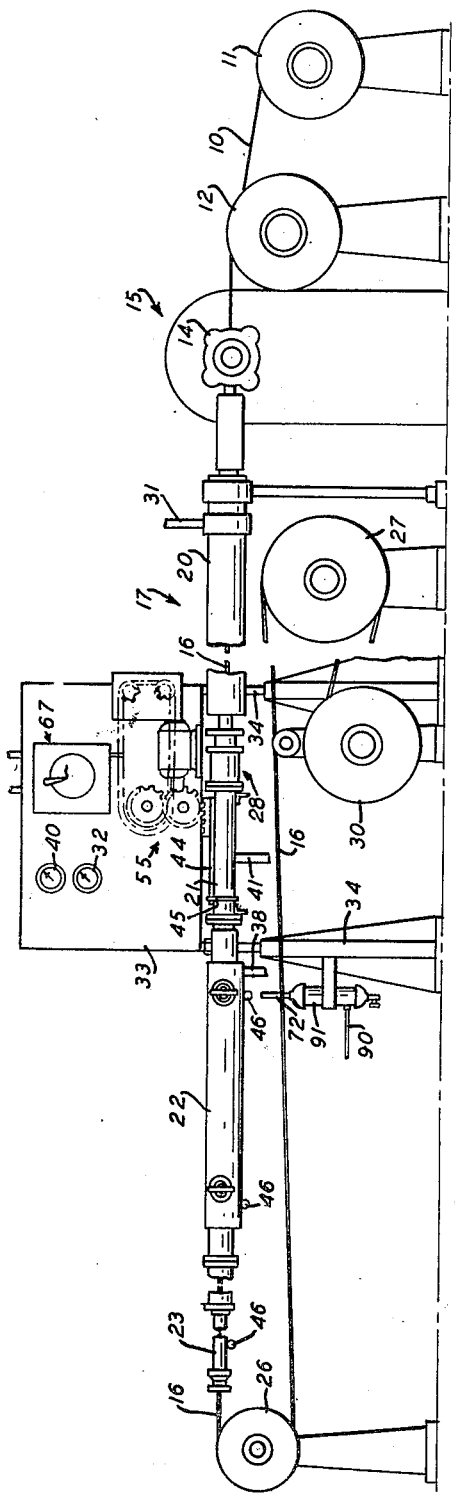
INVENTOR
A. STIEGLER
BY
ATTORNEY

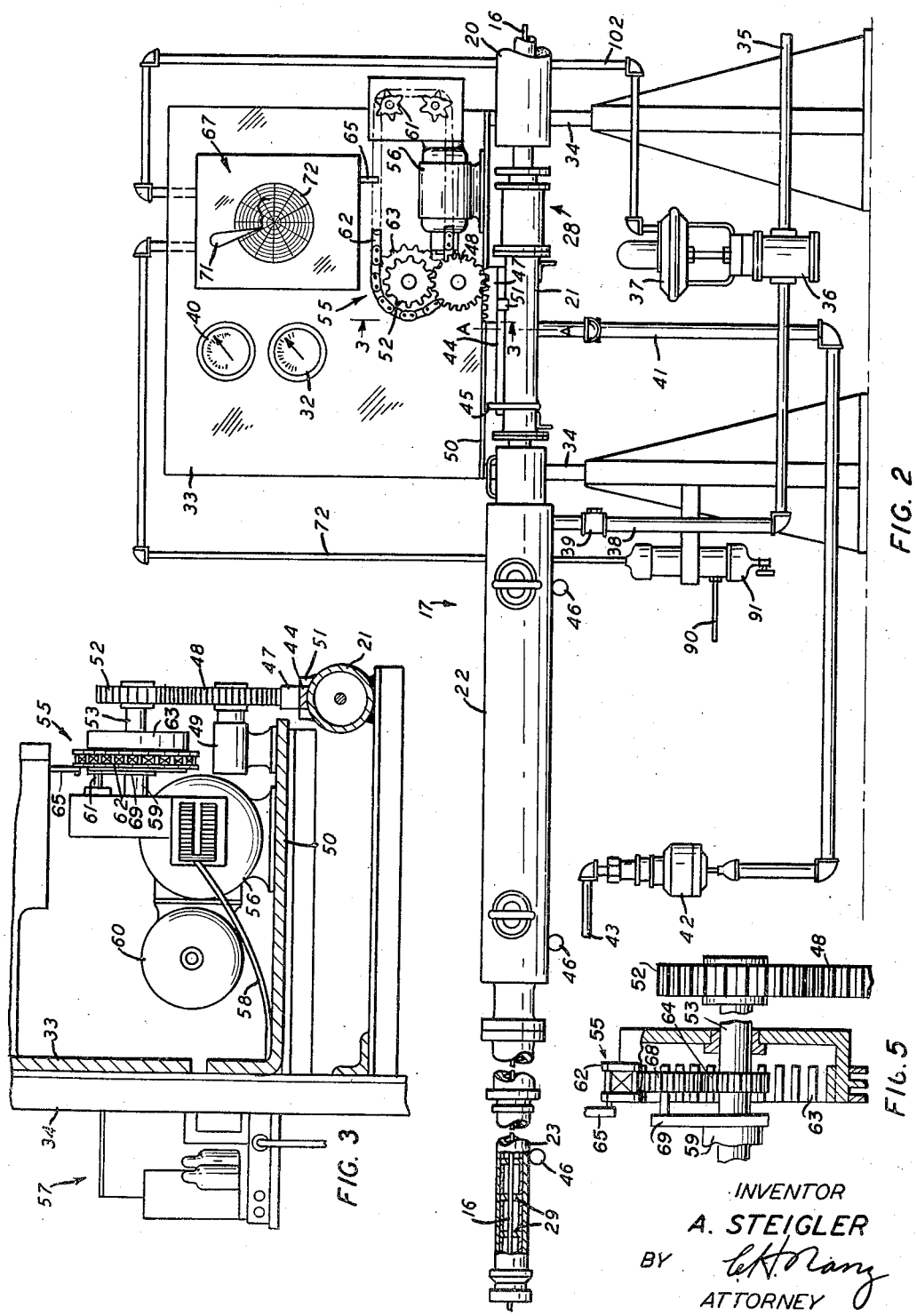

Patented Aug. 18, 1953

2,648,872

UNITED STATES PATENT OFFICE 2,648,872

CONTINUOUS VULCANIZING APPARATUS

August Stiegler, Towson, Md., assignor to Western Electric Company, Incorporated, New York, N. Y., a corporation of New York Application November 8, 1949, Serial No. 126,091

13 Claims. (Cl. 18—6)

This invention relates to continuous vulcanizing apparatus, and more particularly to a pressure control system for continuous vulcanizing apparatus designed to maintain the pressures of a vulcanizing fluid and a cooling fluid substantially in equilibrium.

In the manufacture of filamentary articles having a vulcanized covering, such as insulated and jacketed electrical conductors and cables, a core having a covering of vulcanizable compound applied therearound, is advanced through an elongated vulcanizing tube containing a high pressure, high temperature vulcanizing fluid, such as steam, to vulcanize the covering on the core. Frequently, the core may include a braided or knitted cotton covering beneath the vulcanizable compound. In that case, the vulcanization of the outer covering often develops high internal pressures in pockets of air or moisture entrapped between the textile layer and the covering, which pressure must be reduced materially before the core emerges into the atmosphere to prevent blistering of the vulcanized covering.

This may be accomplished by passing a core and its vulcanizing covering directly from the vulcanizing tube into and through a cooling tube supplied with a low temperature cooling fluid under sufficient pressure to prevent the covering from blistering as it passes therethrough. The vulcanizing tube and the cooling tube may be connected in tandem, and various devices have been proposed for maintaining a minimum leakage of the vulcanizing fluid into the cooling tube at the point where the core passes from the vulcanizing tube into the cooling tube.

Since the cooling water must be maintained at a pressure sufficient to prevent the vulcanized covering from blistering as it passes therethrough, it has been suggested that the cooling fluid be maintained at a pressure substantially equal to the pressure of the vulcanizing fluid to eliminate the use of a mechanical sealing means for maintaining the fluids in their respective tubes. Such an arrangement requires that the pressure differential between the two fluids be maintained at a predetermined minimum value in order to maintain the cooling fluid at its most effective operating temperature, and to prevent excessive loss of the vulcanizing fluid.

An object of the invention is to provide new and improved continuous vulcanizing apparatus.

A further object of the invention is to provide new and improved pressure control systems for continuous vulcanizing apparatus which maintain the pressures of a vulcanizing fluid and a cooling fluid substantially in equilibrium.

An apparatus embodying certain features of the invention comprises an elongated tube through which a continuously advancing core having a vulcanizable covering thereon may be passed, means for supplying a high temperature, high pressure fluid to a portion of the tube first encountered by the core to vulcanize the covering thereon, means for supplying a low temperature fluid under pressure to a portion of the tube subsequently encountered by the advancing core to cool the vulcanized covering, means for controlling the relative pressures of the fluid in their respective portions of the tube, and thermosensitive means responsive to the temperature differential existing between the fluids at spaced points in the tube for continuously regulating the pressure controlling means so as to maintain the pressures of the cooling fluid and the vulcanizing fluid substantially equal.

A complete understanding of the invention will be had from the following detailed description of an apparatus forming a specific embodiment thereof, when read in conjunction with the appended drawings, in which like numerals indicate identical parts throughout the several figures, and in which:

Fig. 1 is a side elevation of a continuous vulcanizing apparatus forming one embodiment of the invention;

Fig. 2 is an enlarged, fragmentary side elevation of a portion of the apparatus shown in Fig. 1;

Fig. 3 is an enlarged vertical section taken along line 3—3 of Fig. 2;

Fig. 4 is an enlarged, schematic view of a portion of the apparatus, and

Fig. 5 is an enlarged fragmentary view of a portion of the apparatus shown in Fig. 3 with some parts thereof broken away to illustrate the construction clearly.

Referring now to the drawings, Fig. 1 shows a general arrangement of a continuous vulcanizing apparatus, which may be used to vulcanize a vulcanizable covering applied around a filamentary core 10. The core 10 may be a bare electrical conductor either solid or stranded, or it may be a conductor having an insulating covering thereon, and a knitted or braided textile covering applied around the insulating covering.

For the purpose of illustrating the present invention, let it be assumed that the core 10 comprises a filamentary metallic core having an insulating covering enclosed in a textile covering. The core 10 is withdrawn from a supply reel 11 rotatably mounted in a suitable manner and passes over a guide pulley 12, which directs the core 10 into an extruding die 14 forming part of a conventional screw type extruding machine indicated generally at 15. As the core 10 passes through the die 14, the extruding machine 15 applies a vulcanizable compound in the form of a covering therearound to produce a jacketed conductor 16. The conductor 16 passes directly from the die 14, through an elongated tube indicated generally at 17 which consists of an heat insulated vulcanizing tube 20, a stuffing box 28, a mixing tube 21 connected in tandem with the vulcanizing tube, a cooling tube 22 connected in tandem with the mixing tube, and a baffled nozzle 23 connected in tandem with the cooling tube 22.

The conductor 16 emerges from the nozzle 23 and passes around a pulley 26, which reverses the direction of travel of the conductor and guides it to a capstan 27 driven at a constant rate of speed by a suitable power means (not shown). After passing around the capstan 27 several times, the conductor 16 is directed to a takeup reel 30, which is rotated by suitable means (not shown) to take up the conductor 16 as fast as it is delivered thereto by the capstan 27.

High temperature, high pressure steam is conducted from a suitable supply source into the vulcanizing tube 20 by a pipe 31 (Fig. 1). As the vulcanizable covering of the conductor 16 passes through the high pressure, high temperature steam, sufficient heat and pressure is applied to the covering to vulcanize it and produce a tough, elastic jacket on the core 10. The vulcanization of the jacket may develop high internal pressures in pockets of air and moisture entrapped in the textile covering and between the textile covering and the vulcanized jacket. These entrapped pressures should be reduced to such a value that there is no danger of the jacket blistering as the conductor 16 emerges from the nozzle 23 into atmospheric pressure. A gauge 32, mounted on a plate 33 secured to a pair of upright supports 34—34, is provided for indicating the pressure of the steam in the vulcanizing tube.

A supply of low temperature water is maintained at a pressure above the maximum pressure of the steam at the supply source. Water from such a supply source is conducted by a pipe 35 (Fig. 2) to a pressure regulating valve 36 arranged to be actuated by an air diaphragm device 37. The water discharging from the valve 36 passes through a pipe 38 and a check valve 39 to the cooling tube 22 at a point adjacent to the entrance end thereof. The cooling water circulates through the cooling tube and discharges from the nozzle 23, which is provided with a plurality of discs 29—29 spacedly positioned therein so as to gradually reduce the pressure of the water as it passes through the nozzle. This construction of the nozzle 23 maintains a substantially uniform hydraulic pressure within the cooling tube for a particular opening of the valve 36. The check valve 39 prevents the steam from flowing into the water supply line 38 should a substantial decrease in the pressure of the water occur in the cooling tube. A gauge 40, mounted on the plate 33, indicates the pressure of the water in the cooling tube.

By maintaining a supply of water in the pipe 35, at a pressure above the maximum pressure of the steam, it is possible to obtain a water pressure in the cooling tube 22 substantially equal to the pressure of the steam in the vulcanizing tube by proper regulation of the valve 36. Such a balanced arrangement prevents excessive escape of steam from the vulcanizing tube into the cooling tube or excessive leakage of water from the cooling tube into the vulcanizing tube without the use of mechanical seals between the adjacent ends of the vulcanizing tube 20 and the cooling tube 22 of the tube 17. Also, cold water at such a pressure cools the vulcanized jacket and reduces the high internal pressures entrapped therein under sufficient pressure to prevent the entrapped pressures from blistering the jacket as it passes through the cooling water. The cooling tube is of such length that the water cools the vulcanized jacket and changes it from a soft consistency to a tough jacket. The jacket in this state is tough enough to withstand the residual internal pressures therein when the conductor 16 emerges from the nozzle into the atmosphere.

When the pressures of the water and steam are substantially equal, they contact each other with their junction point normally positioned midway of the mixing tube 21, in which case, the junction point coincides with line A—A (Fig. 2). A pipe 41 is connected to the mixing tube for transmitting the mixture of steam and water forming at the junction point to a steam trap 42, which is adjusted to discharge the mixture into a drain 43 at a predetermined rate.

In continuous vulcanizing apparatus like that described hereinabove, the pressures of the steam and the water may be subject to substantial variations throughout sustained periods of operation, or it may be that only one of the fluids is subject to variations in pressure while the pressure of the other fluid remains substantially constant. Where the pressure of the steam or the water, or both, is subject to variations in pressure, the relative pressures of the fluids must be continuously controlled so as to maintain the pressures of the fluids substantially equal to prevent water from entering the vulcanizing tube and to prevent excess steam from leaking into the cooling tube.

For purposes of illustrating the present invention, let it be assumed that the supply of the steam for the vulcanizing tube 20 is subject to substantial variations in pressure and that the maximum steam pressure available is supplied to the vulcanizing tube. To maintain a substantial balance between the water and the steam under such conditions, the pressure of the water admitted to the cooling tube may be continuously regulated by varying the opening of the valve 36. The valve 36 is regulated by temperature responsive means, which includes a control bar 44 (Figs. 2 and 3) positioned longitudinally along the mixing tube 21 and having the left-hand end thereof secured to the mixing tube by a suitable clamp 45 (Figs. 1 and 2). The control bar 44 preferably is made of aluminum or an aluminum alloy, but may be made of brass or other metals which have high coefficients of linear expansion. The surface of the control bar 44 adjacent to the mixing tube 21 is curved to fit the contour of the mixing tube so as to obtain maximum heat transfer between the mixing tube and the control bar. The control bar is secured on the mixing tube so that it straddles the normal junction point of the steam and the water, which occurs along line A—A.

Movement of the junction point due to fluctuations in the pressure of the steam changes the heat transfer to the bar and causes elongation or contraction of the bar. Since the lefthand end of the bar is secured to the tube, maximum movement of the bar occurs at the right-hand end thereof. The expansion and contraction of the vulcanizing tube 20 is taken up in the stuffing box 28, positioned between the adjacent ends of the mixing tube and the vulcanizing tube so that its movement is not referred to the mixing tube. The mixing tube is secured to the supports 34—34 in any suitable manner. The cooling tube is supported on rollers 46—46 so that it may expand and contract without moving the mixing tube.

A rack 47 (Figs. 2 and 3) is secured on the right-hand end of the control bar 44, and intermeshes with an idler gear 48 rotatably mounted on a bearing 49 secured to a horizontal plate 50 attached to the supports 34—34. A pair of guides 51—51 are provided on the mixing tube 21 for maintaining the control bar in alignment with the gear 48. The idler gear 48 intermeshes with an input gear 52 keyed to an input shaft 53 forming part of a servomechanism indicated generally at 55. One type of servomechanism which may be used for the purpose of this invention is the Model 61A "Motron Servomechanism," described in the article entitled "A packaged servomechanism" by W. C. Robinette, beginning at page 84 of the March 1948 issue of "Electrical Manufacturing." Its construction and operation will be described herein only insofar as is necessary for a complete understanding of the invention. The "Motron Servomechanism" is a commercially available device manufactured by the W. C. Robinette Company, of 802 Fair Oaks Avenue, South Pasadena, California.

The servomechanism 55 consists generally of a servomotor 56 electrically connected to an electronic unit 57 by a cable 58 (Fig. 3). The electronic unit 57 includes a bridge circuit (not shown) having a set of variable impedance contacts controlled by a governor (not shown) driven by a small motor 60, in accordance with the position of an error eccentric (not shown) mounted on a shaft 59. The input shaft 53 is mounted coaxially within the shaft 59 (Fig. 5) and is keyed to the gear 52 and a sun gear 64, which are mounted thereupon. The sun gear 64 forms part of an epicyclic gear train, and meshes with a planet gear 68 rotatably mounted on a spider 69, which is secured to the shaft 59.

A ring gear 63, having both external and internal teeth, transmits the motion of an endless feedback chain 62, which meshes with the external teeth of said ring gear, to the planet gear 68, which meshes with the internal teeth thereof. The ring gear 63 is rotatably mounted on the input shaft 53 and its rotational movement is independent of said input shaft. It is apparent that linear movement of the feedback chain will result in the rotation of the shaft 59 and the error eccentric. Likewise, any rotation of the input gear 52, keyed to the shaft 53, causes a corresponding rotation of the sun gear 64, thereby rotating the planet gear 68 to rotate the shaft 59 and the attached error eccentric. Thus, the angular position of the shaft 59 and the error eccentric is the algebraic sum of the settings of the input gear 52 and of the ring gear 63, which is operated by the feedback chain 62.

Any movement of the control bar 44 as it contracts or expands due to movement of the junction point of the water and steam in the mixing tube turns the shaft 53 through the gears 48 and 52. Movement of the shaft 53 results in an angular rotation of the error eccentric, which in turn increases or decreases the variable impedance and unbalances the bridge circuit of the electronic unit 57. This action causes an unbalanced potential to be applied to the servomotor 56, which rotates an output shaft 61. The servomotor turns in a direction corresponding to the polarity of the unbalanced potential, and thereby drives the chain 62 in a direction which will rotate the ring gear 63 and intermeshing planet gear 68 to restore a balanced condition in the bridge circuit. The magnitude of the unbalanced condition in the bridge circuit is gradually reduced by movement of the ring gear, in which case, the unbalanced potential and the torque of the servomotor 56 reach zero at the same instant. This arrangement between the servomotor 56 and the electronic unit eliminates overshooting of the servomotor in rebalancing the bridge circuit and thereby prevents oscillation of the servomechanism.

A lever 65 has one end thereof connected to the upper leg of the feed-back chain 62 and the other end thereof keyed to a shaft 66 (Fig. 4) journalled in and forming part of an air controller 67 provided for continuously regulating the admission of air to the diaphragm device 37 of the valve 36. The controller 67 includes a bell crank 70, also keyed to the shaft 66 and having one arm thereof arranged to move a recording pen 71 over a chart 72 by means of a connecting link 73. A lever 75 connects the other arm of the bell crank 70 to the left end of a proportioning lever 76, the other end of which is pivotally mounted on a support 77 at 78. The support 77 is positioned between the lower end of a metal bellows 80 and a compression spring 81.

The assembly of the bellows 80 and the spring 81 is positioned between stationary supports 82 and 83 provided in the controller 67. The spring 81 and the bellows 80 are compressed between the supports, whereby the support 77 assumes a position between the supports corresponding to the difference between the resiliency of the bellows and the spring. An adjustable link 84 has one end connected to the midpoint of the proportioning lever 76 and the other end thereof attached to a flapper 85 pivotally mounted at 86. The length of the link 84 is adjusted so that the lever 76 holds the end of the flapper 85 against the end of a nozzle 87 forming part of an air valve 88 with a force depending upon the position of the bell crank 70 and the position of the support 77 between the supports 82 and 83.

Air under pressure from a suitable supply source is conducted by a pipe 90 to a filter drip well 91, and passes from the filter through a pipe 92 to a passage 93 of a valve 88. The air travels from the passage 93 through a more constricted passage 96 to a small bellows 98 and also to an orifice 97 of the nozzle 87 which is covered by the flapper 85. The air admitted to the passage 93 is maintained at a constant pressure by a suitable pressure regulating means (not shown). The bellows 98 actuates a double-acting valve 100 in such a manner that a portion of the air entering the passage 93 discharges through the valve and into a pipe 101, which supplies air to the top of the bellows 80, and also into a pipe 102, which conducts the air to the diaphragm apparatus 37 of the valve 36. The constant air pressure admitted to the valve 88 also is conducted to the pressure indicating device 105 of the controller 67 in which the bottom pointer indicates the pressure of the air admitted to the valve 88. The air leaving the valve 88 through the pipe 101, also is directed to the indicating device 105 and the upper pointer thereof indicates the pressure of the air admitted to the diaphragm apparatus 37 of the valve 36.

*Operation*

Let it be assumed that the bar 44 is at room temperature, that steam from a suitable supply source is admitted through the pipe 31 into the vulcanizing tube 20 and that the cooling tube is empty. When the bar 44 is at room temperature, the length of the link 84 is adjusted so that the lever 76 holds the end of the flapper 85 tightly against the end of the nozzle 87 and maintain substantially maximum air pressure in the diaphram 37, which in turn holds the valve 36 in its closed position. The steam fills the vulcanizing tube and passes through the mixing tube 21 into the cooling tube 22. Since the mixing tube is filled with steam, the transfer of heat to the control bar 44 is at a maximum, and the resulting elongation of the bar to the right turns the input shaft 53 of the servomechanism 55 in a clockwise direction. This movement of the shaft unbalances the bridge circuit of the electronic unit 57 and causes the servomotor 56 to drive the upper leg of the feedback chain 62 to the left. This movement of the chain 62 causes the lever 65 to turn the shaft 66 in a clockwise direction which moves the free end of the proportioning lever 76 downwardly and thereby reduces the pressure between the flapper 85 and the nozzle 87. This allows maximum escape of air from the nozzle 87 and reduces the pressure of the air admitted to the bellows 80, and to the pipe 102 which conducts the air to the diaphragm 37. This low air pressure on the diaphragm 37 operates the valve 36 to its maximum open position whereby water from the pipe 35 enters the cooling tube 22 at a pressure which is momentarily greater than that of the steam.

The low air pressure in the bellows 80 allows the spring 83 to move the support 77 upwardly and collapse the bellows. This movement of the support 77 moves the pivoted end of the lever 76 upwardly and thereby increases the pressure between the flapper and the nozzle. This increases the pressure of the air admitted to the bellows 80 and to the diaphragm 37 of the valve 36. The increased air pressure in the diaphragm 37 reduces the opening of the valve slightly, and, consequently, reduces the pressure of the water in the cooling tube. At the same time, the increase in air pressure in the bellows 80 expands the bellows and lowers the pivoted end of the lever 76 which decreases the pressure between the flapper and the nozzle. This causes the pressure of the water in the cooling tube to increase slightly in the above-described manner. Thus, the initial operation of the lever 65 to the left causes the controller 67 to regulate the pressure of the water in the cooling tube so that it exceeds the pressure of the steam in correspondingly decreasing amounts as the bellows 80 alternately expands and contracts with the regulation of the flapper 85. This operation of the controller 67 prevents overshooting the required water pressure and resulting oscillation of the controller 67.

During the time that the water pressure exceeds the steam pressure, it moves the junction point to the right towards the line A—A. As the water enters the mixing tube, the control bar 44 gives up some of its heat to the cold water, and as a result, the free end of the bar moves slightly to the left. This movement of the bar turns the input shaft 53 in a counterclockwise direction, which movement of the shaft unbalances the bridge circuit of the electronic unit 57 and causes the servomotor to move the upper leg of the chain 62 from left to right. This movement of the chain 62 balances the bridge circuit and moves the lower end of the lever 65 to the right as viewed in Fig. 2, which, in turn, raises the free end of the lever 76 and thereby increases the pressure of the flapper against the nozzle 87. This adjustment of the flapper increases the pressure of the air admitted to the diaphragm 37 of the valve 36 and, consequently, reduces the pressure of the water admitted to the cooling tube 22. As the junction point of the steam and the water approaches the line A—A, the control bar 44 contracts slowly, whereby the rate of movement of the junction point to the right gradually decreases and it finally coincides with the line A—A without any hunting or oscillation.

The link 84 of the controller 67 is adjusted so that when the lever 65 is in its vertical position (Fig. 4), the valve 88 regulates the opening of the valve 36 so that the water pressure is substantially equal to the starting steam pressure. The balanced condition is obtained by adjusting the length of the link 84 until the gages 32 and 40 indicate that the water pressure is substantially equal to the steam pressure. As long as the pressure of the steam remains at a predetermined value, the servomechanism 55 and the controller 67, in response to the length of the bar 44, will maintain a predetermined differential between the pressure of the water and the steam and thereby maintain their junction point at the line A—A.

When the pressure of the water is brought into substantial balance with the pressure of the steam in this manner, the means driving the capstan 27 is energized to withdraw the core 10 from the reel and advance it through the die 14 where it receives a covering of a vulcanizable compound to form the jacketed conductor 16. The conductor 16 advances through the vulcanizing tube 20 where the temperature and pressure of the steam are sufficient to vulcanize the vulcanizable covering to a tough, elastic form. The conductor 16 passes directly from the vulcanizing tube into and through the mixing tube 21 and then into the cooling tube 22. The low temperature water in the cooling tube cools the vulcanized covering, and the pressure at which the water is maintained prevents the covering from blistering as it passes through the cooling fluid. The cooled covering now is tough enough to withstand the remaining internal pressures entrapped in the covering when it emerges into the atmosphere.

Let it be assumed that a substantial change suddenly occurs in the pressure differential between the cooling water and the vulcanizing steam due to a sudden increase in the pressure of the steam supplied to the vulcanizing tube. The change in the pressure differential is in favor of the steam, and as a result, the steam overcomes the water pressure and causes the junction point to move toward the left-hand end of the mixing tube. As this condition takes place, the heat transfer to the control bar 44 increases and causes an elongation of the bar, which turns the idler gear 48 in a counterclockwise direction when viewed in Fig. 2. This movement of the idler gear turns the gear 52 and the shaft 53 in a clockwise direction. This movement of the shaft 53 unbalances the bridge circuit included in the electronic unit 57, in which case, a potential is applied to the servomotor 56.

The polarity of the unbalanced potential resulting from this movement of the input shaft 53 is such that it turns the servomotor 56 so that it drives the upper leg of the chain 62 from right to left. This movement of the chain turns the ring gear 63 in a direction to restore the bridge circuit of the electronic unit 57 to a balanced condition, and also actuates the lower end of the lever 65 to the left and thereby turns the shaft 66 in a clockwise direction. The shaft 66, in turn, rotates the bell crank 70 in a clockwise direction which lowers the free end of the proportioning lever 76 and decreases the pressure between the end of the flapper 85 and the nozzle 87. This movement of the flapper increases the amount of air escaping through the nozzle 87, and, consequently, decreases the pressure of the air admitted to the bellows 80 and to the diaphragm 37 of the valve 36. This reduced air pressure on the diaphragm 37 increases the opening of the valve 36, whereby the pressure of the water admitted to the cooling tube 22 is increased.

Since a substantial portion of the mixing tube is filled with steam before the control bar 44 responds to the error in the pressure differential between the water and the steam, the heat transfer to the bar is such that the initial regulation of the valve 36 results in a water pressure in the cooling tube which exceeds the pressure of the steam in the vulcanizing tube. As a result, the water stops further movement of the junction point and starts moving the junction point back toward its normal position in the mixing tube. The initial regulation of the valve 36 causes the water pressure to exceed the steam pressure only momentarily because the subsequent operation of the bellows 80 alternately decreases and increases the pressure of the water in the cooling tube. This operation of the bellows serves to check the movement of the junction point to the right and prevent it from overshooting its normal position in the mixing tube.

As the water moves toward the normal junction point in the mixing tube, the heat transfer from the control bar 44 to the water side of the mixing tube causes the bar to contract slightly. This contraction of the bar turns the idler gear 48 in a clockwise direction and the gear 52 and the shaft 53 in a counterclockwise direction. This movement of the shaft 53 unbalances the bridge circuit of the electronic unit in such a manner that the polarity of the unbalanced potential turns the servomotor in a direction which moves the upper leg of the chain 62 from left to right. This movement of the chain 62 rebalances the bridge circuit and also actuates the lever 65 so as to turn the shaft 66 in a counterclockwise direction and increases the pressure between the end of the flapper 85 and the nozzle 87. This movement of the flapper decreases the amount of air escaping from the nozzle 87 and, consequently, increases the pressure of the air applied to the diaphragm apparatus 37 of the valve 36.

The increase in the pressure of the air on the diaphragm apparatus decreases the opening of the valve 36 and thereby slightly reduces the pressure of the water admitted to the cooling tube 22. The pressure of the water still exceeds that of the steam due to the off-center position of their junction point. Therefore, the junction point continues to move toward the line A—A, and the gradual movement thereof continuously decreases the length of the bar 44, which in turn effects a regulation of the valve 36 to gradually reduce the pressure of the water until it is substantially equal to the steam pressure when the junction point coincides with the line A—A. When the junction point reaches the line A—A, the servomechanism 55 holds the bell crank 70 in a position which regulates the valve 88 so as to maintain the pressure of the water substantially equal to the increased pressure of the steam.

The sudden increase in the pressure of the steam is accompanied by a corresponding increase in the temperature of the steam. The increased temperature of the steam results in an increased heat transfer to the bar 44 when the junction point coincides with the line A—A and a corresponding adjustment of the servomotor mechanism so that the lever 65 is not restored to its initial vertical position when the junction point coincides with line A—A. As a result, the lever is positioned to the left of its initial vertical position, and in this position, the lever maintains an increased escape of air from the nozzle 87, and a corresponding increased opening in the valve 36.

The servomechanism 55 and the controller 67 are continuously regulated by the length of the control bar 44 and regulate the valve 36 so as to maintain the predetermined pressure differential between the steam and the water as long as the pressure of the steam remains substantially constant.

Let it be assumed that a substantial change occurs in the pressure differential between the water and the steam due to a sudden decrease in the pressure of the steam in the vulcanizing tube. Under such conditions, the change in the pressure differential is in favor of the water, whereby the water moves the junction point to the right in the mixing tube. This movement of the junction point increases the portion of the control bar 44 subjected to the low temperature water and thereby reduces the temperature of the control bar causing the free end of the bar to move to the left. This movement of the bar 44 turns the shaft 53 in a counterclockwise direction which unbalances the bridge circuit and causes the servomotor to drive the endless chain 62 so that the upper leg thereof moves from left to right, as viewed in Fig. 2.

This movement of the chain 62 moves the lower end of the lever 65 to the right and thereby turns the bell crank 70 in a counterclockwise direction, which movement urges the free end of the proportioning lever 76 upwardly. This movement of the proportioning lever 76 increases the pressure between the free end of the flapper 85 and the nozzle 87 and decreases the amount of air escaping from the nozzle. This effects a corresponding increase in the pressure of the air admitted to the diaphragm 37, which in turn, reduces the opening of the valve 36 and effects a corresponding reduction in the pressure of the water in the cooling tube.

The initial regulation of the valve 36, as a result of the sudden decrease in the pressure of the steam, is such that the steam pressure now exceeds the pressure of the water slightly and checks the longitudinal movement of the junction point of the water and steam to the right and then starts the junction point moving slowly to the left toward its normal position in the mixing tube. The bellows 80 of the controller 67, operates in response to the initial movement of the lever 65 to alternately increase and decrease the pressure of the water in the cooling tube so as to keep the movement of the junction point from overshooting its normal position in the mixing tube.

As the steam moves back into the mixing tube, the heat transfer to the control bar 44 is gradually increased, which results in a corresponding elongation of the bar. This elongation effects a slight unbalance in the bridge circuit and a movement of the servomotor in the opposite direction, which continually adjusts the opening of the valve 36 until it brings the pressure of the water in the cooling tube substantially equal to the pressure of the steam in the vulcanizing tube. This operation of the servomotor 56 maintains the lever 65 to the right of its initial position. The servomotor mechanism 55 and the controller 67 continue to operate in this manner to maintain the pressure of the water substantially equal to the reduced pressure of the steam until a change in the pressure of the steam again unbalances the pressure differential normally desired between the steam and the water.

In the system described hereinabove, the pressure of the water preferably should be slightly less than the pressure of the steam at all times, because a small leakage of hot water from the junction point into the cooling tube is preferable over the reverse condition. A pressure differential in favor of the steam is desirable because it maintains steam consumption at a minimum and assures complete vulcanization of the jacket on the core. It is believed to be apparent from the above description that this pressure control system may be adjusted readily in conjunction with the rate of discharge of the water from the nozzle 23 and the rate of discharge of the mixed fluids from the junction point to obtain such an operating pressure differential between the water and the steam.

The pressure control system including the control bar 44, the servomotor mechanism 55, the controller 67 and the valve 36 is arranged to regulate the pressure of the water in the cooling tube because the steam pressure is subject to variations as the demand on the steam supply varies. However, in some installations, the steam and water supply means may be such that the pressure of the steam supply is substantially constant and the water supply is subject to variations in pressure over sustained periods of time. Under these conditions, a pressure regulating valve similar to the valve 36 is positioned in the steam supply line. When the water pressure changes, the resulting change in length of the control bar 44 due to the movement of the junction point of the water and steam effects a regulation of the valve in the steam line so as to maintain the steam pressure substantially equal to the variable water pressure.

In operating continuous vulcanizing apparatus like that described hereinabove, it has been found that a steam pressure of at least 150 pounds per square inch in the vulcanizing tube will satisfactorily vulcanize the covering on the conductor advancing therethrough. Under certain operating conditions established by the size of the conductor and the rate at which it travels through the vulcanizing tube, it has been found that a vulcanizing tube approximately 200 feet long having steam therein under a pressure of about 250 pounds per square inch will prove satisfactory. With such a steam pressure, the water in the supply line 35 is maintained at a pressure of about 270 pounds per square inch to allow for fluctuations in the steam pressure at the supply source. The valve 36 is regulated by the control bar 44 through the servomotor 56 and the controller 67 in the above-described manner to reduce the pressure of the water supply in the pipe 35 so that the pressure of the water in the cooling tube is slightly less than the pressure of the steam. Under these conditions, it has been found that, when the cooling tube 22 is approximately sixteen to nineteen feet long and the nozzle 23 is approximately three feet long, the apparatus will cool the covering and reduce the internal pressures entrapped therein so that danger of the covering blistering after it has passed through the cooling tube is prevented.

While the above-described pressure control system is particularly well adapted for maintaining the pressure of the cooling water substantially equal to the pressure of the vulcanizing steam in a continuous vulcanizing apparatus, it may be readily adapted to maintain a predetermined pressure differential between various kinds of fluids used in different types of manufacturing processes without departing from the spirit and scope of the invention. It is believed to be apparent that in processes where the supply of one processing fluid is maintained at a constant pressure, and the supply of another processing fluid is subject to variations in pressure, the pressure control system described herein will regulate continuously the pressure of the fluid having a constant pressure supply source so as to maintain it substantially equal to the pressure of the fluid having the variable pressure supply source.

What is claimed is:

1. An apparatus for the continuous vulcanization of a vulcanizable covering surrounding a continuously advancing core, which comprises an elongated tube through which the core passes continuously, means for supplying a high temperature, high pressure fluid to a portion of the tube first encountered by the core to vulcanize the covering thereon, means for supplying a low-temperature cooling fluid under pressure to a portion of the tube subsequently encountered by the core to cool the vulcanized covering, means for controlling the relative pressures of the fluids in the tube, thermo-sensitive means subject to and having a length dependent upon the temperatures of the fluids at a predetermined point in the tube, means for amplifying the motion resulting from changes in the length of the thermo-sensitive means, due to changes in the temperatures of the fluids at said predetermined point in the tube, and means actuated by the motion amplifying means for regulating the pressure controlling means so as to maintain the pressures of the vulcanizing fluid and the cooling fluid in the tube substantially equal.

2. An apparatus for the continuous vulcanization of a vulcanizable covering surrounding a continuously advancing core, which comprises an elongated tube through which the core passes continuously, means for supplying high temperature, high pressure fluid to a portion of the tube first encountered by the core to vulcanize the covering thereon, means for supplying a low temperature cooling fluid under pressure to a portion of the tube subsequently encountered by the core to cool the vulcanized covering, means for controlling the relative pressures of the fluids in the tube, thermo-sensitive means subject to and having a length dependent upon the temperatures of the fluids at a predetermined point in the tube, variations in the pressure of either of the fluids causing corresponding changes in the temperatures of the fluids with respect to the thermo-sensitive means, and an electronically controlled servomotor responsive to changes in the length of the thermo-sensitive means for continuously regulating the pressure controlling means so as to maintain the pressures of the vulcanizing fluid and the cooling fluid in the tube substantially equal.

3. An apparatus for the continuous vulcanization of a vulcanizable covering surrounding a continuously advancing core, which comprises an elongated tube through which the covered core passes continuously, means for supplying high temperature, high pressure steam to a portion of the tube first encountered by the core to vulcanize the covering thereon, means for supplying low temperature water to the portion of the tube subsequently encountered by the core at a pressure substantially equal to that of the steam to cool the vulcanized covering, means for selectively regulating the relative pressures of the water and the steam in the tube, thermo-sensitive means subject to and having a length dependent upon the temperatures of the steam and water at their normal junction point in the tube, variations in the pressure of either fluid in its portion of the tube causing corresponding changes in the temperatures of the fluids with respect to the thermo-sensitive means, means for amplifying the motion resulting from the changes in length of the thermo-sensitive means, and a mechanism actuated by the motion amplification means for continuously regulating the pressure controlling means so as to maintain the pressures of the cooling water and the vulcanizing steam substantially equal.

4. An apparatus for the continuous vulcanization of a vulcanizable covering surrounding a continuously advancing core, which comprises an elongated tube through which the core passes continuously, means for supplying a high temperature, high pressure fluid to a portion of the tube first encountered by the core to vulcanize the covering thereon, means for supplying a low temperature cooling fluid to a portion of the tube subsequently encountered by the core at a pressure substantially equal to that of the vulcanizing fluid to cool the vulcanized covering, the fluids contacting each other with their junction point normally positioned at a predetermined point in the tube, one of said fluids being subject to substantial variations in pressure in its portion of the tube due to variations in the pressure of the fluid at its supply source, means for selectively controlling the pressure of the fluid having a substantially constant supply pressure, thermo-sensitive means, having a length which varies with its temperature, positioned on the tube so as to be subject to the temperatures of the fluids at their normal junction point, said variations in the pressure of one of the fluids causing movement of the junction point and corresponding changes in the heat transferred from the fluids to the thermo-sensitive means at the normal junction point of the fluids, an electronically controlled means for amplifying the motion resulting from changes in the length of the thermo-sensitive means, and a mechanism actuated by the electronically controlled means for regulating the pressure controlling means so as to maintain the pressures of the fluids substantially equal.

5. In an apparatus for the continuous vulcanization of a vulcanizable covering surrounding a continuously advancing core including an elongated tube through which the core passes continuously, means for supplying a high temperature, high but fluctuating pressure fluid to a portion of the tube first encountered by the core to vulcanize the covering thereon, and means for supplying a low temperature cooling fluid to a portion of the tube subsequently encountered by the core at a pressure substantially equal to that of the vulcanizing fluid to cool the vulcanized covering, whereby the vulcanizing fluid and the cooling fluid contact each other with their junction point normally positioned at a predetermined point in the tube, the improvement which comprises means for selectively controlling the pressure of the cooling fluid in its portion of the tube, thermo-sensitive means subject to and having dimensions dependent upon the temperatures of the fluids at the normal junction point of said fluids, said fluctuating pressure of the vulcanizing fluid causing movement of the junction point and corresponding changes in the heat transfer from the fluids to the thermo-sensitive means, an electronically controlled servomechanism for amplifying the motion resulting from changes in the dimensions of the thermo-sensitive means, and an air operated mechanism responsive to the servomechanism for continuously regulating the pressure controlling means so as to maintain the pressures of the vulcanizing fluid and the cooling fluid substantially equal.

6. In an apparatus for the continuous vulcanization of a vulcanizable covering surrounding a continuously advancing core which includes an elongated tube through which the core passes continuously, means for supplying a high temperature, high but fluctuating pressure fluid to a portion of the tube first encountered by the core to vulcanize the covering thereon and means for supplying a low temperature cooling fluid to a portion of the tube subsequently encountered by the core at a pressure substantially equal to that of the vulcanizing fluid to cool the vulcanized covering, whereby said vulcanizing fluid and the cooling fluid contact each other with their junction point normally positioned at a predetermined point in the tube, the improvement which comprises means for selectively controlling the pressure of the cooling fluid in its portion of the tube, thermo-sensitive means subject to and having dimensions dependent upon the temperatures of the fluids at the normal junction point of the fluids, said fluctuating pressure of the vulcanizing fluid causing movement of the junction point and corresponding changes on the heat transfer from the fluids to the thermo-sensitive means, and an electronically controlled servomotor responsive to changes in the dimensions of the thermo-sensitive means for regulating the cooling fluid pressure controlling means so as to maintain the pressures of the cooling fluid and the vulcanizing fluid substantially equal.

7. In an apparatus for the continuous vulcanization of a vulcanizable covering surrounding a continuously advancing core, which includes an elongated tube through which the core passes continuously, means for supplying high temperature, high but fluctuating pressure fluid to a portion of the tube first encountered by the core to vulcanize the covering thereon and means for supplying a low temperature cooling fluid to a portion of the tube subsequently encountered by the core to cool the vulcanized covering, whereby the vulcanizing fluid and the cooling fluid contact each other with their junction point normally positioned at a predetermined point in the tube, the improvement which comprises means for selectively regulating the pressure of the cooling fluid in its respective portion of the tube, an aluminum bar positioned on the tube so that a portion thereof is subject to the temperature of the vulcanizing fluid and a portion thereof is subject to the temperature of the cooling fluid at the normal junction point of the fluids, said fluctuating pressure of the vulcanizing fluid causing longitudinal movement of the junction point and corresponding changes in the heat transfer between the fluids and aluminum bar, and an electronically controlled servomotor responsive to expansions and contractions of the aluminum bar for continuously regulating the pressure controlling means so as to maintain the pressure of the cooling fluid substantially equal to the pressure of the vulcanizing fluid.

8. In an apparatus for the continuous vulcanization of a vulcanizable covering surrounding a continuously advancing core which includes an elongated tube through which the covered core passes continuously, means for supplying high temperature, high but fluctuating pressure steam to a portion of the tube first encountered by the core to vulcanize the covering thereon and means for supplying low temperature water to the portion of the tube subsequently encountered by the core at a pressure substantially equal to that of the steam to cool the vulcanized covering whereby the vulcanizing fluid and the cooling fluid contact each other with their junction point normally positioned at a predetermined point in the tube, the improvement which comprises means for selectively regulating the pressure of the cooling water in its respective portion of the tube, an elongated thermo-sensitive member having a high coefficient of linear expansion positioned on the tube so that it is subject to the temperatures of the fluids at their normal junction point, said fluctuations of the pressure of the steam causing longitudinal movement of the junction point and contractions and expansions of the thermo-sensitive member, air-operated means for controlling the operation of the water pressure regulating means, means for selectively controlling the pressure of the air supplied to the air-operated means, and means responsive to the contractions and expansions of the thermo-sensitive member for continuously regulating the air pressure control means so as to regulate the water pressure controlling means and maintain the pressure of the cooling water substantially equal to the pressure of the steam.

9. An apparatus for the continuous vulcanization of a vulcanizable covering surrounding a continuously advancing core, which comprises an elongated vulcanizing tube through which a covered conductor may be advanced, means for supplying a high temperature, high but fluctuating pressure fluid to the vulcanizing tube to vulcanize the covering on the conductor, a cooling tube through which the conductor passes upon leaving the vulcanizing tube, means for supplying a cooling fluid to the cooling tube adjacent its entrance end at a pressure substantially equal to the pressure of the vulcanizing fluid for cooling the vulcanized covering, means connecting the adjacent ends of the vulcanizing tube and the cooling tube, the vulcanizing fluid and the cooling fluid contacting each other with their junction point normally positioned at a predetermined point in the connecting means, means for selectively regulating the pressure of the cooling fluid in the cooling tube, a thermosensitive member, having a length dependent upon its temperature, positioned on the connecting means so that a portion thereof is subject to the temperature of the vulcanizing fluid and a portion thereof is subject to the temperature of the cooling fluid at the normal junction point of the fluids, said fluctuating pressure of the vulcanizing fluid causing longitudinal movement of the junction point and corresponding changes in the heat transfer to the thermo-sensitive means, and an electronically controlled servomotor responsive to changes in the length of the thermo-sensitive means for continuously regulating the pressure controlling means so as to maintain the pressure of the cooling fluid substantially equal to the pressure of the vulcanizing fluid.

10. An apparatus for the continuous vulcanization of a vulcanizable covering surrounding a continuously advancing core, which comprises an elongated vulcanizing tube through which the covered conductor may be advanced, means for supplying high temperature, high but fluctuating pressure fluid to the vulcanizing tube to vulcanize the covering on the conductor, a cooling tube through which the conductor passes upon leaving the vulcanizing tube, means for supplying a cooling fluid at a pressure substantially equal to the pressure of the vulcanizing fluid to the cooling tube to cool the vulcanized covering, means connecting the adjacent ends of the vulcanizing tube and the cooling tube, means for selectively regulating the pressure of the cooling fluid supplied to the cooling tube, the cooling fluid and the vulcanizing fluid contacting each other with their junction point normally positioned at the midpoint of the connecting means, a thermo-sensitive member having a high coefficient of linear expansion positioned on the connecting means so that it is subject to the temperatures of the fluids at their normal junction point, fluctuations in the pressures of the fluids causing longitudinal movement of the junction point and changes in the length of the thermo-sensitive member, air-operated means for controlling the operation of the cooling fluid pressure regulating means, means for selectively controlling the pressure of the air supplied to the air-operated means, and means responsive to contractions and expansions of the thermo-sensitive member for continuously regulating the air pressure controlling means so as to regulate the water pressure controlling means and maintain the pressure of the cooling fluid substantially equal to the pressure of the vulcanizing fluid.

11. An apparatus for the continuous vulcanization of a vulcanizable covering surrounding a continuously advancing core, which comprises an elongated vulcanizing tube through which the covered conductor may be advanced, means for supplying high temperature, high but fluctuating pressure fluid to the vulcanizing tube to vulcanize the covering on the conductor, a cooling tube through which the conductor passes upon leaving the vulcanizing tube, means for supplying a cooling fluid to the cooling tube at a pressure substantially equal to the pressure of the vulcanizing fluid to cool the vulcanized covering, means connecting the adjacent ends of the vulcanizing tube and the cooling tube, the cooling fluid and the vulcanizing fluid contacting each other with their junction point normally positioned at the midpoint of the connecting means, means for selectively regulating the pressure of the cooling fluid in the cooling tube, an elongated thermo-sensitive member having a high coefficient of linear expansion positioned on the connecting means so that it is subject to the temperatures of the fluids at their normal junction point, said fluctuation in the pressure of the vulcanizing fluid causing longitudinal movement of the junction point and corresponding contractions and expansions of the thermo-sensitive member, air-operated means for controlling the operation of the cooling fluid pressure regulating means, means for selectively controlling the pressure of the air supplied to the air-operated means, and an electronically controlled servomotor responsive to contractions and expansions of the thermo-sensitive means for continuously regulating the air pressure controlling means so as to regulate the water pressure controlling means and maintain the pressure of the cooling fluid substantially equal to the pressure of the vulcanizing fluid.

12. An apparatus for the continuous vulcanization of a vulcanizable covering surrounding a continuously advancing conductor, which comprises means for subjecting the covering on the advancing conductor to a high temperature, high but fluctuating pressure fluid to vulcanize the covering thereon, said vulcanization of the covering developing internal pressures in pockets of air and moisture entrapped in the covering, means for subjecting the vulcanized covering to a low temperature cooling fluid at a pressure substantially equal to the pressure of the vulcanizing fluid as it emerges from the vulcanizing fluid to cool the vulcanized covering, means connecting the adjacent ends of the vulcanizing means and the cooling means, the vulcanizing fluid and the cooling fluid contacting each other with their junction point normally positioned at a predetermined point in said connecting means, thermo-sensitive means, having a length which varies with temperature changes, positioned on the connecting means so that a portion thereof is subject to the temperature of a vulcanizing fluid and the portion thereof is subject to the temperature of the cooling fluid at the normal junction point, and means for amplifying the motion resulting from changes in the length of the thermo-sentitive means resulting from movement of the junction point of the fluids, and means actuated by the motion amplification means for continuously maintaining the pressures of the vulcanizing fluid and the cooling fluid substantially equal, whereby the cooling fluid is maintained at a pressure and temperature which reduces the internal pressures in the vulcanized covering to such values that there is no danger of the covering blistering as the conductor passes through the cooling fluid and from the cooling fluid into the atmosphere.

13. An apparatus for the continuous vulcanization of a vulcanizable covering surrounding a continuously advancing conductor, which comprises an elongated vulcanizing tube through which such a conductor may be advanced, means for supplying high temperature steam at approximately 250 lbs. pressure to the vulcanizing tube to vulcanize the covering on the conductor, said steam supply being subject to substantial variations in pressure, an elongated cooling tube through which the insulated conductor passes after it emerges from the vulcanizing tube, means connecting the adjacent ends of the vulcanizing tube and the cooling tube, a supply of low temperature water maintained at a pressure of about 270 pounds per square inch, means for continuously supplying water from said high pressure supply to the cooling tube to cool the vulcanized covering, adjustable means provided in the water supplying means for selectively controlling the pressure of the water in the cooling tube so that only a predetermined leakage of steam from the junction point into the cooling tube occurs, said steam and water contacting each other with their junction point normally positioned at a predetermined point within the connecting means, means positioned at the exit end of the cooling tube through which the conductor passes for regulating the discharge of the water therefrom, an aluminum bar positioned on the connecting means so that it is subject to the temperatures of the steam and the water at the junction point thereof, fluctuations in the pressure of the steam causing longitudinal movement of the junction point and corresponding changes in the heat transfer to the bar, means for amplifying the motion resulting from contractions and expansions of the aluminum bar, an air operated mechanism actuated by the motion amplification means for continuously adjusting the water pressure controlling means so as to maintain the water in the cooling tube at a pressure a predetermined amount below the pressure of the steam in the vulcanizing tube, and means associated with the air operated mechanism to prevent overshooting the required water pressure and the resulting oscillation of the junction of the steam and water.

AUGUST STIEGLER.

References Cited in the file of this patent

UNITED STATES PATENTS

| Number | Name | Date |
| --- | --- | --- |
| 2,069,087 | Forstrom et al. | Jan. 26, 1937 |
| 2,426,341 | Canfield | Aug. 26, 1947 |
| 2,446,620 | Swallow et al. | Aug. 10, 1948 |

FOREIGN PATENTS

| Number | Country | Date |
| --- | --- | --- |
| 864,121 | France | Jan. 8, 1941 |